July 20, 1965     F. F. W. KROHN     3,195,841
DOUBLE WALL CELLULAR BEAM STRUCTURE
Filed Nov. 21, 1962     3 Sheets-Sheet 1

INVENTOR.
FRITZ F. W. KROHN

BY *Carl R. Brown*

ATTORNEY

July 20, 1965 F. F. W. KROHN 3,195,841
DOUBLE WALL CELLULAR BEAM STRUCTURE
Filed Nov. 21, 1962 3 Sheets-Sheet 2

FIG. 2

INVENTOR.
FRITZ F. W. KROHN
BY *Carl R. Brown*

ATTORNEY

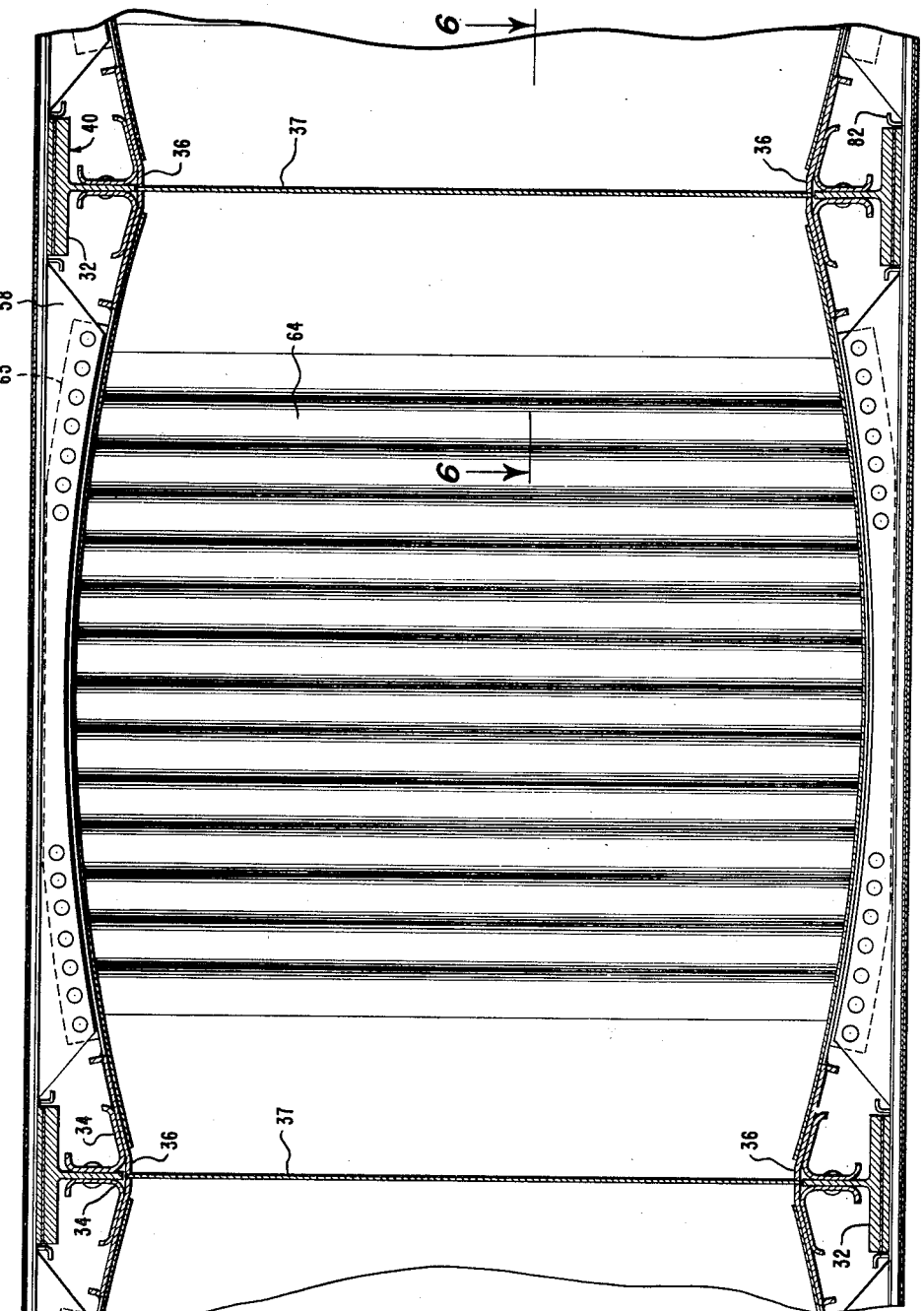

3,195,841
DOUBLE WALL CELLULAR BEAM STRUCTURE
Fritz F. W. Krohn, Del Mar, Calif., assignor to General
  Dynamics Corporation, San Diego, Calif., a corporation
  of Delaware
      Filed Nov. 21, 1962, Ser. No. 239,133
          20 Claims. (Cl. 244—123)

This invention relates to a double wall cellular beam structure and more particularly to a double wall cellular beam structure that may be used in construction of supersonic aircraft.

The design and construction of supersonic aircraft or other vehicles must take into consideration the increasingly severe temperature environments that are encountered in flight. The temperature of the outer wing surfaces is elevated considerably by the slower moving high temperature boundary layer air surrounding the wing during flight at high Mach numbers. However, it is desirable that the temperature of the propulsion fluids or gases carried by and contained within the wing be maintained at a temeprature below the outer wing temperature. Otherwise certain fuels may become decomposed and rendered useless for engine consumption. The lower temperature fuel thus acts as a heat sink maintaining the structural components of the wing in contact with the fuel at a temperature below that of the sructural components in close proximity to or directly exposed to the boundary layer airstream.

In usual wing constructions where the thermal expansion of the structure is restrained by the adjacent internal structure of lower temperature, the thermal expansion differential between the two structures induces undesirable thermal stresses in the entire structural assembly. Consequently the resultant thermal stresses of such wing constructions require that the strength of the structure be sufficiently increased to provide adequate strength for sustaining the external loads imposed thereon. In increasing the structural strength of the wing, a weight penalty is to be expected which may be of such a magnitude as to be considered intolerable as far as supersonic aircraft is concerned.

The weight-stress situation is further complicated by fuel pressurization requirements that are imposed to hold vapor losses down. The pressures required to hold losses to a given level will increase with fuel temperature. In aircraft presently known in the art, the high pressures of the fluid or gas within the wing fuel tanks act to bend the outer composite wing cover panels thereby distorting the shape of the airfoils. If fuel pressures are permitted to excessively deform outer aerodynamic surfaces, the performance and speed of the aircraft will be reduced or impaired beyond acceptable limits. Since the distortion caused by thermal stresses in the presence of heat sinks adds an additional increment of distortion to the airfoil, the combined distortions may cause a distortion condition that is most undesirable.

Wing structures as well as other like aircraft structures are generally rigid throughout their cross-section. As in the manner previously described, when the outer wing shell is caused to grow by thermal expansion, and as the interior wing structure expands at a different rate due to its lower temperature, the growth or expansion of the outer hot shell is restrained by the cooler interior structure giving rise to the aforesaid thermal stresses. Such thermal stresses result in loading the structure at a time when its material strength has decreased under the influence of higher temperature. Thus the necessity of having to add additional material or structure to the aircraft wing in order to assure the structural integrity thereof under combined external and internal load conditions, also proportionately increases the overall weight of the aircraft. Of most serious consequence as a result of this is that thermal stresses are not short time stresses, but are additive to the other long time stresses aircraft structures are subjected to in flight. Consequently the mean fatigue stress level is raised by the amount of thermal stress, thereby adversely affecting fatigue life of the structure and requiring adding of additional structure to insure structural integrity. This, of course, imposes an additional weight penalty. Such weight increases coupled with lowered fatigue stress levels and stress levels raised by the amount of thermal stress must be taken into account in the time-temperature-stress relationship in designing the structure for a particular creep life which may result again in increased weight or shorter aircraft life or limitation of the aircraft to operaate the lower flying speeds associated with lower temperatures.

It is therefore an object of this invention to provide a new and improved structure.

It is another object of this invention to provide a structure with a high degree of freedom from internal structural restraint for alleviation of thermal stresses caused by temperature differentials within the structure, thus making the structure less prone to failure under fatigue stress levels that have been increased as a result of lasting thermal stresses and thus minimize the need for reduction of these stresses by designing and/or developing heavier structures.

It is another object of this invention to provide a structure providing for a high degree of freedom from internal structural restraint for alleviation of thermal stresses caused by temperature gradients within the structure thus making the structure less prone to creep deformation under enduring time-temperature and stress levels that have been raised by thermal stresses.

It is another object of this invention to provide a wing structure that is partially composed of an all-welded inner container that has been sealed by weldment processes other than fillet type fusion weldment.

It is another object of this invention to provide a wing structure that is partially composed of an all welded inner container having an outer shell that is removable for inspection of the main load carrying member and easily replacable.

It is another object of this invention to provide an improved structural element for use in fabricating a structure of relatively light weight and simple construction for vehicles traveling in a temperature environment varying sufficiently from the temperature of the fluids or gases contained in the internal integral containers to cause thermal gradients and thermal stresses across the structure.

It is another object of this invention to provide an improved structural element for use in constructing a wing structure suitable for use in high temperature flight environments and capable of providing good aerodynamic smoothness and thermal insulation for protecting the internally carried fluid.

This invention pertains to a structure that generally comprises an internal sealed compartment for carrying fuel. This compartment is covered by an outer spaced skin portion that is a load carrying part of the overall structure. The internal compartment is of a double-wall, cellular, beam type construction wherein upper and lower surface members of the compartments have a shallow cylindrical shape with sides and end portions being attached to rigidly positioned bulkheads and spars that are in turn connected to the outer skin structure. The upper and lower members are thus suspended in hoop tension between the rigid members and are spaced from the outer skin. The outer skin is secured to the rigid members and the arrangement of the structure is such that even though the outer skin member increases in dimensions due to a temperature rise, the skin still maintains its integrity and functions as a structural member of the entire assembly. The internal compartment has a rigid construction with its upper and lower members being capable of expanding, contracting or flexing through the hoop tension arrangement without contacting the outer skin. Thus the outer or aerodynamic smoothness of the skin structure is maintained. The structure may be constructed through normal welded, built-up construction permitting repair and easy access for maintenance and inspection as required.

The structural element thus comprises a cellular beam box which has, at its extremities, longitudinal vertical shear members for absorbing bending loads. The shear members form sides of a catenary fuel cell or tank and support upper and lower positioned tank walls. The box is then covered on its upper and lower surfaces by removable outer skin panels. This affords a space between the inner and outer walls to contain air or material for insulation therebetween. The structure is thus capable of effecting insulation of fuel and a high degree of aerodynamic smoothness of the outer skin, since the fuel tank pressures do no affect the outer contour significantly. Lateral beads in the tank walls reduce pick up of bending loads and tend to minimize thermal stresses due to temperature differentials.

Other objects and many attended advantages of this invention will be readily apparent as the same becomes better understood by reference to the following description, when considered in connection with the accompanying drawings, in which like reference numerals designate like parts throughout the figures thereof and wherein:

FIGURE 2 is an enlarged fragmentary perspective view of a portion of the wing with parts broken away and in section to facilitate the illustration.

FIGURE 5 is a cross-sectional view taken along lines 5—5 of FIGURE 2, and

Figure 1:
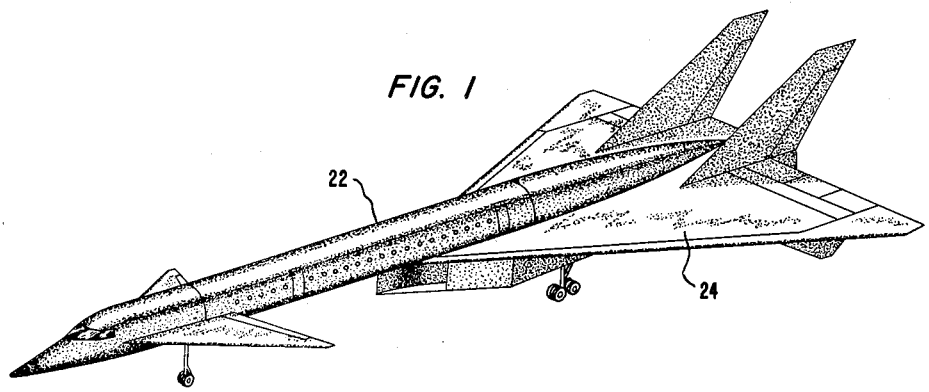
FIGURE 1 is a perspective view of an aircraft having a wing constructed in accordance with the structure of the present invention.

Referring now to FIGURE 2, there is shown a structural element that may be used in constructing a multispar airfoil section of a wing of a high velocity aircraft, such as is shown in FIGURE 1. It should be readily understood that this structure can also be used in airframe structures or other high velocity vehicles but it has particular advantage when used in high velocity aircraft wing structures such as herein described.

The structural element shown in FIGURE 2 comprises spar members 39 that lie laterally along the wing structure 24 of the aircraft 22. The spar members or sections divide the wing into compartments that are spaced longitudinally of the wing structure 24. Rib members or sections 26 and bulkheads 28 are positioned longitudinally along the wing structure 24 forming laterally spaced individual compartments between each of the spar members 39 along the wing structure 24. These compartments bordered by bulkheads members 28 and spar members 39 effect a fluid tight wall construction for the containment of fuel. External covering means 66 are secured to the upper and lower surfaces of the rib and spar members to provide an outer cover for the structural element in addition to creating a void or an airspace between the outer surface panels 66 and the internal fuel compartments.

The spar members 39 comprise a corrugated web 30 welded to and integral with cruciform stiffeners 37 and 38, which stiffeners are located at the rib and bulkhead stations and secure the spar members 39 to the bulk head 28 and rib members 26, respectively. The cruciform stiffeners 38 are attached by fusion weld burn down, burn through or a similar process to tie-in strips 36 that form the upper and lower support portion of the spar member 39. The tie-in strips 36 also form the inner portion of the spar cap group 40. Tie-in strips 36 are connected to L-shaped side channels 34 which are in turn secured to the depending leg portion of a T-shaped spar cap 32. If desired, an insulation strip 42 adapted to reduce heat conductivity between the outer skin 66 and spar member 39 may be secured to spar cap 32. A reinforced cover panel 82 having a plurality of corrugations disposed normal to spar members 39 is secured to spar cap 32 by fasteners 83 which pass through the insulation strip 42 into spar cap 32. The corrugations of cover panel 82 are aligned with the corrugations 76 on the underside of the outer covering means 66. The outer covering means 66 is secured to the spar cap T member 32 by appropriate rivets or fasteners through oversize holes 78.

Figure 6:
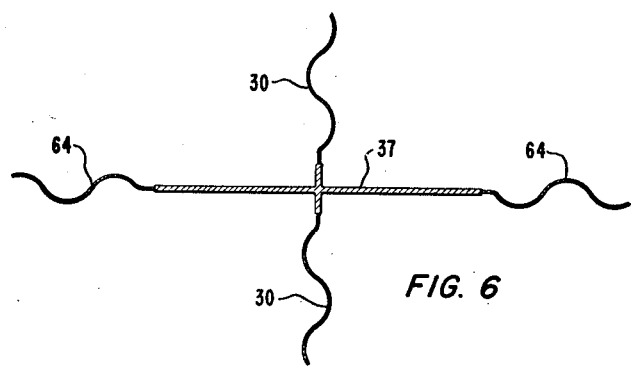
FIGURE 6 is a cross-sectional view taken along the line 6—6 of FIGURE 5.

The rib members or sections 26 comprise diagonally disposed ribs 49 having their opposite ends secured to cruciform stiffeners 38 adjacent the upper and lower portions thereof at successive spar members 39. The ribs 49 comprise two hat-shaped beams secured together in a back-to-back relationship. These ribs 49 are the principal structural member of the rib members 26. Secured to the cruciform stiffeners 38 and rib 49 are an upper rib cap 50 and a lower rib cap 52 both having a flange of a generally arcuate shape corresponding to the contour of the upper and lower tank walls 44. Rib cap members 50 and 52 function as spacer elements providing structural integrity to the upper and lower portion of the rib section 26. Both the upper and lower rib cap members 50 and 52 are fixed to tie-in members 55 which serve to secure the upper and lower tank walls 44 to the upper and lower rib T-shaped cap members 58 and 59. The combined elements of this structure form a unitary rib structure of open truss construction whereby fluid contained within the tanks is permitted to flow freely between and around the rib members 26. The upper rib cap member 50 has an aperture 62 therein that functions as a vent hole to permit the passage of gas or gas bubbles in the fluid through the aperture and along the upper surface of the tanks. A similar aperture 60 in lower rib cap 52 permits fuel flow through the rib. Edges of the outer skin 66 are secured to the respective rib cap members in a manner that will be described in detail hereinafter. The rib members 26 are primary structural members having the major portion of their structure, as previously described, located in the fuel containing compartment. In certain locations, bulkhead members are substituted for rib members to provide fluid tight side wall members for the individual compartments. The width of the compartments is established by using either bulkhead members or rib members at rib stations. The bulkhead members comprise a bulkhead web 64 of corrugated material having plates 67 with edges conforming to the corrugation configuration welded to the upper and lower extremities thereof. Tie-in members 65 welded to plates 67 serve to secure the bulkhead members to upper and lower rib T cap members 58 and 59. Opposite ends of bulkhead web 64 secure to the cruciform stiffeners 37 as by butt welding as shown in FIGURE 6 of the drawings. Rib caps 61 are flat barlike members extending across the individual compartments above and below each of the bulkhead member locations and rib member locations. Rib caps 61 are sandwiched between the outer cover panels 66 and the T cap members 58 and 59. The tank well members 44, are secured to the bulkhead members in the manner as previously described relative to the rib members.

In assembling the double well cellular beam structure of the present invention, the spar members 39 are jig located and the tank walls 44 are formed to a predetermined radius and progressively installed together with portions of the rib 49 and the bulkhead members to form the fluid tight tank. Tank walls 44 are secured along their sides to tie-in strips 36 of spar members 39 and along their ends to the tie-in members 65 of the bulkhead and rib members. A plurality of parallelly spaced beads 48 formed in the tank walls 44 follow along the curve thereof terminating a distance slightly beyond the overlap of tie-in strips 36 with tank walls 44. Beads 48 provide means for the tank walls 44 to expand in a direction parallel with the spar members 39.

Figures 3, 4:
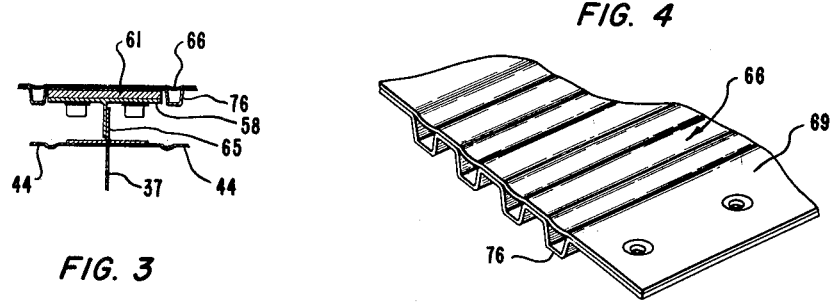
FIGURE 3 is a cross-sectional view taken along lines 3—3 of FIGURE 2.
FIGURE 4 is a fragmentary perspective view of the outer skin structure.

The outer cover means 66, see FIGURE 4, comprises a sheet or skin 69 secured to a corrugated member 76 as by welding. The areas 68 or skin 69 which bridge the individual troughs of the corrugated member 76 are dished or scalloped slightly to permit the outer cover means 66 to grow or expand as a result of aerodynamic heating. The outer cover 66 is secured to the T cap members 58, see FIGURE 3, by screws, fasteners or the like.

The tank walls 44 curve outwardly and thus resist fuel pressures in hoop tension with little deflection thereof. However since the tank walls 44 do not contact, throughout their suspended surface, the outer cover member 66, minor deflections of the tank member that do occur will not be transmitted directly to the outer cover 66. Accordingly, the fuel pressure acting upon the tank walls 44 does affect the aerodynamic smoothness of the outer wing cover 66, it does so only to a negligible extent. The resulting cavity that exists between tank walls 44 and outer wing cover 66 effects an air space above the upper and below the lower tank walls 44 while the individual valleys of the corrugated member 76 provide passageways for the air to flow across the spars 39 to exhaust to atmosphere at the wing edges. This free flow of air permits the escape of fuel gases or fumes that may collect in these cavities as a result of a fuel tank leak, to be discharged harmlessly overboard. In addition to acting as a venting means, these cavities further serve to reduce heat transfer from the outer cover panel 66 to the tank walls 44. Moreover since the cavities are open to atmosphere, the effectiveness of the air insulating properties at high altitudes is proportionally increased as a result of the decrease in the density of the ambient air.

In operation, the spar, rib and bulkhead members form the principal load carrying structure and the principal wing bending and shear loads are carried by the spar T caps 32 and webs 30. The outer cover panels 66 assume the principal aerodynamic pressure loads and transmit these loads to the adjoining spars, ribs and bulkheads. Accordingly, the combination of the outer cover panels 66, spars 39, bulkheads 28 and ribs 26 in cooperation with the tank walls 44, provide torsional stiffness to the composite structure.

When the structure of the instant invention is subjected to a temperature environment varying significantly from the temperature level of the fluids or gases carried in the fuel compartment, the arrangement and construction of the individual components of the composite structure coact with one another in a manner such as to minimize or eliminate the occurrence of thermal stresses. In this substantially stress-devoid construction, the spar T caps 32 are free to extend to their maximum thermal length with but little restraint from the connecting interior structure since the spar webs 30 are corrugated and the tank walls 44 are beaded in order to provide for longitudinal expansion thereof. Consequently while the spar webs 30 and the tank walls 44 are cooled to a temperature near the temperature of the fluids or gases contained therein, they will not restrain thermal growth of the spar caps as the temperature of the spar cap rises to more closely approximate that of the outer skin. Thus thermal stresses that would normally occur as a result of thermal growth of the spar caps 32 are, by arrangement of the present structure, reduced to a minor magnitude. The bulkhead members 64 may, through expansion of its corrugations, assume a length corresponding to the thermal growth of the T cap member 58. The rib member 26 provides reduced resistance to thermal growth of the rib T cap because of the diagonal positioning of the diagonal rib member between the cruciform stiffeners 38. The curved tank walls 44 are adapted to flatten slightly accommodating the thermally increased length of the rib cap T members 58. Consequently, the expandable construction of the components of the inner structure provide means whereby the outer structural members are permitted to grow without inducing thermal stresses of a significant magnitude into the individual members thereof. The outer cover panels 66 upon being subjected to elevated temperatures, will lengthen or expand in a longitudinal direction and thus cause a proportionate lengthening of the attached and underlying T cap members 58. Transverse lengthening of the outer cover panels 66 is provided for by the minute-sized scallops lying between the troughs of the corrugations of the attached corrugated member 76 as hereinbefore described.

From the foregoing description, it will be readily apparent that the structure of the present invention not only embodies insulating qualities, but further serves to substantially eliminate the occurrence of thermal stress within the components of the structure.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A double wall cellular beam structure capable of being subjected to high temperature environments comprising:
    an outer covering means for being directly exposed to said high temperature environment;
    an inner structure fixedly secured to said outer covering means and being shielded from said high temperature environment by said outer covering means;
    compartments secured to and positioned within said inner structure;
    each of said outer covering means and said inner structure embodying expandable constructions which are expandable in multiple directions;
    and said outer covering means being expandable independently of said inner structure and said compartments.

2. A double wall cellular beam structure capable of being subjected to high temperature environments comprising:
    an outer covering means directly exposable to said high temperature environment;
    said outer covering means comprising a skin secured to a corrugated member;
    an inner structure fixedly secured to said outer covering means;
    said inner structure having a plurality of fluid-tight compartments;
    each of said outer covering means and said inner structure embodying expandable constructions;
    and said outer covering means being expandable independently of said inner structure.

3. A double wall cellular beam structure capable of being subjected to high temperature environments comprising:
    an outer covering means directly exposable to said high temperature enviroment;
    an inner structure fixedly secured to said outer covering means;

said inner structure having fluid-tight compartments including;

spar members having a fluid-tight surface;

bulkhead members having a fluid-tight surface interconnecting said spar members;

said interconnecting spar members and bulkhead members having upper and lower surfaces;

tank wall members interconnecting said spar members and said bulkhead members adjacent said upper and lower surfaces;

said spar members, bulkhead members and tank wall members forming fluid-tight container means therebetween;

each of said outer covering means and said inner structure embodying expandable constructions;

and said outer covering means being expandable independently of said inner structure.

4. A double wall cellular beam structure capable of being subjected to high temperature environments comprising:

an outer covering means directly exposable to said high temperature environment;

an inner structure fixedly secured to said outer covering means;

said inner structure having fluid-tight compartments including;

spar members having a fluid-tight surface;

bulkhead members having a fluid-tight surface interconnecting said spar members;

said interconnecting spar members and bulkhead members having upper and lower surfaces;

tank wall members interconnecting said spar members and said bulkhead members adjacent said upper and lower surfaces;

said tank wall members being curved outwardly in the dimension between said spar members;

said spar members, bulkhead members and tank wall members forming fluid-tight container means therebetween;

each of said outer covering means and said inner structure embodying expandable constructions;

and said outer covering means being expandable independently of said inner structure.

5. A double wall cellular beam structure capable of being subjected to high temperature environments comprising:

an outer covering means directly exposable to said high temperature environment;

an inner structure fixedly secured to said outer covering means;

said inner structure having fluid-tight compartments including;

spar members having a fluid-tight surface;

bulkhead members having a fluid-tight surface interconnecting said spar members;

said interconnecting spar members and bulkhead members having upper and lower surfaces;

tank wall members interconnecting said spar members and said bulkhead members adjacent said upper and lower surfaces;

said tank wall members being curved outwardly in the dimension between said spar members;

said outer covering means being spaced from said tank wall members providing an uninterrupted space between adjacent ones of said outer covering means and said tank wall members;

said spar members, bulkhead members and tank wall members forming fluid-tight container means therebetween;

each of said outer covering means and said inner structure embodying expandable constructions;

and said outer covering means being expandable independently of said inner structure.

6. A double wall cellular beam structure capable of being subjected to high temperature environments comprising:

an outer covering means directly exposable to said high temperature environment;

an inner structure fixedly secured to said outer covering means;

said inner structure having fluid-tight compartments including;

spar members having a fluid-tight surface;

bulkhead members having a fluid-tight surface interconnecting said spar members;

said interconnecting spar members and bulkhead members having upper and lower surfaces;

tank wall members interconnecting said spar members and said bulkhead members adjacent said upper and lower surfaces;

said tank wall members being curved outwardly in the dimension between said spar members;

rib members spaced between said bulkhead members and interconnecting said spar members;

said rib members being secured to said outer covering means through said tank wall members;

said outer covering means being spaced from said tank wall members providing an uninterrupted space between adjacent ones of said outer covering means and said tank wall members and between said spar members and said bulkhead and said rib members;

said spar members, bulkhead members and tank wall members forming fluid-tight container means therebetween;

each of said outer covering means and said inner structure embodying expandable constructions;

and said outer covering means being expandable independently of said inner structure.

7. A double wall cellular beam structure capable of being subjected to high temperature environments comprising:

an outer covering means directly exposable to said high temperature environment;

said outer covering means comprising a skin secured to a corrugated member;

an inner structure fixedly secured to said outer covering means;

said inner structure having fluid-tight compartments including;

spar members having a fluid-tight surface;

bulkhead members having a fluid-tight surface interconnecting said spar members;

said interconnecting spar members and bulkhead members having upper and lower surfaces;

tank wall members interconnecting said spar members and said bulkhead members adjacent said upper and lower surfaces;

said tank wall members being curved outwardly in the dimension between said spar members;

rib members spaced between said bulkhead members and interconnecting said spar members;

said rib members being secured to said outer covering means through said tank wall members;

said outer covering means being spaced from said tank wall members providing an uninterrupted space between adjacent ones of said outer covering means and said tank wall members and between said spar members and said bulkhead and said rib members;

said spar members, bulkhead members and tank wall members forming fluid-tight container means therebetween;

each of said outer covering means and said inner structure embodying expandable constructions;

and said outer covering means being expandable independently of said inner structure.

8. A double wall cellular beam structure capable of being subjected to high temperature environments comprising:
an outer covering means directly exposable to said high temperature environment;
an inner structure fixedly secured to said outer covering means;
said inner structure having fluid-tight compartments including;
spar members having a fluid-tight surface;
bulkhead members having a fluid-tight surface interconnecting said spar members;
said interconnecting spar members and bulkhead members having upper and lower surfaces;
tank wall members interconnecting said spar members and said bulkhead members adjacent said upper and lower surrfaces;
said tank wall members being curved outwardly in the dimension between said spar members;
rib members spaced between said bulkhead members and interconnecting said spar members;
said rib members being secured to said outer covering means through said tank wall members;
said outer covering means being spaced from said tank wall members providing an uninterrupted space between adjacent ones of said outer covering means and said tank wall members and between said spar members and said bulkhead and said rib members;
means in said space for thermally insulating said outer covering means from said tank wall members;
said spar members, bulkhead members and tank wall members forming fluid-tight container means therebetween;
each of said outer covering means and said inner structure embodying expandable constructions;
and said outer covering means being expandable independently of said inner structure.

9. A double wall cellular beam structure capable of being subjected to high temperature environments comprising:
an outer covering means directly exposable to said high temperature environment;
said outer covering means comprising a skin secured to a corrugated member;
said skin having dished portions lying between the individual troughs of said corrugated member;
an inner structure fixedly secured to said outer covering means;
said inner structure having a plurality of fluid-tight compartments;
each of said outer covering means and said inner structure embodying expandable constructions;
and said outer covering means being expandable independently of said inner structure.

10. A double wall cellular beam structure capable of being subjected to high temperature environments comprising:
an outer covering means directly exposable to said high temperature environment;
said outer covering means comprising a skin secured to a corrugated member;
said skin having scalloped portions lying between the individual troughs of said corrugated member;
an inner structure fixedly secured to said outer covering means;
said inner structure having fluid-tight compartments including;
spar members having a fluid-tight surface;
bulkhead members having a fluid-tight surface interconnecting said spar members;
said interconnecting spar members and bulkhead members having upper and lower surfaces;
tank wall members interconnecting said spar members and said bulkhead members adjacent said upper and lower surfaces;
said spar members, bulkhead members and tank wall members forming fluid-tight container means therebetween;
each of said outer covering means and said inner structure embodying expandable constructions;
and said outer covering means being expandable independently of said inner structure.

11. A double wall cellular beam structure capable of being subjected to high temperature environments comprising:
an outer covering means directly exposable to said high temperature environment;
said outer covering means comprising a skin secured to a corrugated member;
said skin having dished portions lying between the individual troughs of said corrugated member;
an inner structure fixedly secured to said outer covering means;
each of said outer covering means and said inner structure embodying expandable constructions;
and said outer covering means being expandable independently of said inner structure.

12. In a wing structure for use in a high external temperature environment:
spar members having a fluid tight surface;
bulkhead members having a fluid tight surface interconnecting said spar members;
said interconnected spar members and bulkhead members having upper and lower surfaces;
tank wall members interconnecting said spar members and said bulkhead members adjacent said upper and lower surfaces forming fluid tight container means therebetween for carrying relatively low temperature fluids;
said tank wall members being curved outwardly in the dimension between said spar members;
outer covering means for contacting said high external temperature environment being attached to said upper and lower surfaces enclosing said members;
said outer covering means being spaced from said tank wall members providing an uninterrupted space between adjacent ones of said outer covering means and said tank wall members;
means in said space for thermally insulating said outer covering means from said tank wall members;
expansion joint means for attaching said covering means to said bulkhead members;
and means for attaching said covering means to said spar members in the manner allowing thermal expansion of said covering means relative to said spar members.

13. In a combination forming portions of an aircraft wing:
a framework of spar and bulkhead structural members covered on top and bottom with a plurality of covering panels;
said spar and bulkhead members each including a longitudinal corrugated member having corrugations lying perpendicular to said covering panels;
longitudinal cap means secured to the top and bottom of said corrugated members for rigidly connecting said spar members and said bulkhead members to said covering panels;
expansion joint means for attaching said covering panels to said bulkhead cap means;
and means for attaching said covering panels to said spar cap means in a manner allowing thermal expansion of said covering panels relative to said cap means.

14. In a combination forming portions of an aircraft wing:
a framework of spar and bulkhead structural members covered on top and bottom with a plurality of covering panels;
said spar and bulkhead members each including a longitudinal corrugated member having corrugations lying perpendicular to said covering panels;

longitudinal cap means secured to the top and bottom of said corrugated members for rigidly connecting said spar members and said bulkhead members to said covering panels;

expansion joint means for attaching said covering panels to said bulkhead cap means;

means for attaching said covering panels to said spar cap means in a manner allowing thermal expansion of said covering panels relative to said cap means;

and temperature insulation means positioned between said covering panels and said cap means.

15. A combination forming portions of an aircraft wing, the combination comprising:

a framework of spar and bulkhead structural members covered on top and bottom with a plurality of covering panels;

said spar and bulkhead members each including a longitudinal corrugated member having corrugations lying perpendicular to said covering panels;

longitudinal cap means secured to the top and bottom of said corrugated members for rigidly connecting said spar members and said bulkhead members to said covering panels;

tank wall members being connected to said top and bottom cap means for enclosing the space between said spar members and said bulkhead members forming a fluid tight container therewithin;

expansion joint means for attaching said covering panels to said bulkhead cap means;

and means for attaching said covering panels to said spar cap means in a manner allowing thermal expansion of said covering panels relative to said cap means.

16. A combination forming portions of an aircraft wing, the combination comprising:

a framework of spar and bulkhead structural members covered on top and bottom with a plurality of covering panels;

said spar and bulkhead members each including a longitudinal corrugated member having corrugations lying perpendicular to said covering panels;

longitudinal cap means secured to the top and bottom of said corrugated members for rigidly connecting said spar members and said bulkhead members to said covering panels;

tank wall members having outwardly arcuate shapes in one dimension being connected to said top and bottom cap means for enclosing the space between said spar members and said bulkhead members forming a fluid tight container therein;

said tank wall members being spaced from said covering panels providing an insulating space therebetween;

expansion joint means for attaching said covering panels to said bulkhead cap means;

and means for attaching said covering panels to said spar cap means in a manner allowing thermal expansion of said covering panels relative to said cap means.

17. A combination forming portions of an aircraft wing, the combination comprising:

a framework of spar and bulkhead and rib structural members covered on top and bottom with a plurality of covering panels;

said rib members being spaced between said bulkhead members;

said spar and bulkhead members each including longitudinal corrugated members having corrugations lying perpendicular to said covering panels;

longitudinal cap means secured to the top and bottom of said corrugated members and the top and bottom of said rib members rigidly connecting said spar members and said bulkhead members and said rib members to said covering panels;

tank wall members having an outwardly arcuate shape in one dimension being connected to said top and bottom cap means to bridge across said spar members and said bulkhead members forming a fluid tight container therewithin;

said tank wall members being spaced from said covering panels providing an uninterrupted space defined by said spar members and said bulkhead members and said rib members;

expansion joint means for attaching said covering panels to said bulkhead cap means and said rib cap means;

and means for attaching said covering panels to said spar cap means in a manner allowing thermal expansion of said covering panels relative to said cap means.

18. A combination forming portions of an aircraft wing, the combination comprising:

a framework of spar and bulkhead and rib structural members sandwiched between covering panels;

said spar and bulkhead members each including longitudinal corrugated members having corrugations lying perpendicular to said covering panels;

longitudinal cap means rigidly connecting said spar members and said bulkhead members and said rib members to said covering panels;

said cap means for said spar and bulkhead members comprising longitudinal flange members shaped on one edge to conform to said corrugations of said corrugated members;

said flange members being attached to said corrugated members and extending laterally therefrom;

T-beam members extending the length of said spar and bulkhead members;

a depending leg portion of said T-beam members being positioned between pairs of side channels;

said side channels being secured to said depending leg of said T-beam members and to said flange members;

said rib members comprising a primary structural beam connected to and extending between the lower and upper cap means of said adjacent spar members;

tank wall members having an outwardly arcuate shape in the length dimension between said spar members and being connected to said top and bottom cap means for enclosing the space between said spar members and said bulkhead members and said bulkhead members forming a fluid tight container therewithin;

said tank wall members being spaced from said covering panels providing an uninterrupted space defined by said spar members and said bulkhead members and said rib members;

expansion joint means for attaching said covering panels to said bulkhead cap means and said rib cap means;

means for attaching said covering panels to said spar cap means in a manner allowing thermal expansion of said covering panels relative to said cap means;

and said tank wall members having means across the width dimension between said rib members and said bulkhead members for allowing restrained increase in said width dimension.

19. A double wall cellular beam structure comprising:

an inner structure;

compartments integral with said inner structure;

said inner structure and said compartments being expandable in multiple directions;

an outer covering means;

said outer covering means being secured to said inner structure; and said outer covering means being expandable in multiple directions independently of said inner structure and said compartments.

20. A double wall cellular beam structure comprising:
an inner structure;
compartments integral with said inner structure;
said compartments being expandable in multiple directions;
an outer covering means;
said outer covering means being secured to said inner structure;
said outer covering means being spaced from said compartments; and
said outer covering means being expandable in multiple directions independently of said compartments.

References Cited by the Examiner
UNITED STATES PATENTS

| | | | |
|---|---|---|---|
| 2,133,668 | 10/38 | Potez | 244—123 |
| 2,365,781 | 12/44 | Smith | 244—123 X |
| 2,749,061 | 6/56 | Franz | 244—125 |
| 2,945,653 | 7/60 | Atkin | 244—119 |
| 2,997,262 | 8/61 | Kirk et al. | 244—123 |
| 3,064,317 | 11/62 | Dobson | 244—117 X |
| 3,076,625 | 2/63 | Griffith | 244—117 |

MILTON BUCHLER, *Primary Examiner.*

FERGUS S. MIDDLETON, *Examiner.*